(12) United States Patent
Sullivan et al.

(10) Patent No.: US 7,678,312 B2
(45) Date of Patent: Mar. 16, 2010

(54) METHOD OF TREATING RUBBER COMPOSITION WITH CURE INHIBITOR TO CREATE SOFT SKIN IN GOLF BALL CORE

(75) Inventors: Michael J. Sullivan, Barrington, RI (US); Brian Comeau, Berkley, MA (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 12/048,665

(22) Filed: Mar. 14, 2008

(65) Prior Publication Data

US 2009/0020911 A1 Jan. 22, 2009

Related U.S. Application Data

(63) Continuation-in-part of application No. 11/772,903, filed on Jul. 3, 2007, now Pat. No. 7,537,529.

(51) Int. Cl.
*B29C 45/14* (2006.01)

(52) U.S. Cl. .............. 264/134; 264/265; 264/266; 264/279; 264/347; 264/320; 264/319

(58) Field of Classification Search ............. 264/135, 264/279.1, 248, 250, 266, 265, 320, 317, 264/347, 255, 134, 279; 473/371; 471/371
See application file for complete search history.

(56) References Cited

U.S. PATENT DOCUMENTS

| | | | |
|---|---|---|---|
| 3,784,209 A | 1/1974 | Berman | |
| 3,986,802 A | 10/1976 | Isom | |
| 4,570,937 A | 2/1986 | Yamada | |
| 4,650,193 A | 3/1987 | Molitor et al. | |
| 5,033,748 A | 7/1991 | Ebisuno | |
| 5,334,673 A | 8/1994 | Wu | |
| 5,484,870 A | 1/1996 | Wu | |
| 5,516,110 A | 5/1996 | Yabuki et al. | |
| 5,697,856 A | 12/1997 | Moriyama et al. | |
| 5,733,206 A | 3/1998 | Nesbit et al. | |
| 5,782,707 A | 7/1998 | Yamagishi et al. | |
| 5,803,834 A | 9/1998 | Yamagishi et al. | |
| 5,957,784 A | 9/1999 | Asakura et al. | |
| 5,976,443 A | 11/1999 | Nesbitt et al. | |
| 6,113,831 A | 9/2000 | Nesbitt et al. | |
| 6,319,154 B1 | 11/2001 | Yoshida et al. | |
| 6,432,342 B1 | 8/2002 | Nesbitt et al. | |
| 6,494,793 B1 | 12/2002 | Ohama | |
| 6,494,794 B1 | 12/2002 | Ohama | |
| 6,506,851 B2 | 1/2003 | Wu | |
| 6,533,683 B2 | 3/2003 | Watanabe | |
| 6,537,158 B2 | 3/2003 | Watanabe | |
| 6,632,147 B2 | 10/2003 | Cavallaro et al. | |
| 6,659,888 B2 | 12/2003 | Endo et al. | |
| 6,679,791 B2 | 1/2004 | Watanabe | |
| 6,689,860 B2 | 2/2004 | Iwami | |
| 6,739,986 B2 | 5/2004 | Higuchi et al. | |
| 6,805,644 B1 | 10/2004 | Moriyama et al. | |
| 6,815,521 B2 | 11/2004 | Iwami | |
| 6,835,794 B2 | 12/2004 | Wu et al. | |
| 6,837,803 B2 | 1/2005 | Nanba et al. | |
| 6,921,345 B2 | 7/2005 | Higuchi et al. | |
| 6,932,720 B2 | 8/2005 | Hogge et al. | |
| 7,004,854 B2 | 2/2006 | Hogge et al. | |
| 7,153,224 B2 | 12/2006 | Higuchi et al. | |
| 7,182,702 B2 | 2/2007 | Hogge et al. | |
| 2002/0013184 A1* | 1/2002 | Morgan | 473/376 |
| 2003/0191264 A1* | 10/2003 | Crass et al. | 526/310 |
| 2004/0116211 A1* | 6/2004 | Sullivan et al. | 473/374 |
| 2004/0230005 A1* | 11/2004 | Voorheis et al. | 525/256 |
| 2005/0022914 A1* | 2/2005 | Maier et al. | 152/209.1 |
| 2005/0176523 A1* | 8/2005 | Boehm et al. | 473/354 |
| 2007/0015605 A1* | 1/2007 | Kim et al. | 473/371 |

* cited by examiner

*Primary Examiner*—Khanh Nguyen
*Assistant Examiner*—Keith T Aziz
(74) *Attorney, Agent, or Firm*—William B. Lacy

(57) ABSTRACT

A method of making a golf ball comprising the steps of providing a preform comprising an uncured polybutadiene composition; coating the preform with a first cure-altering material; curing the coated preform at a predetermined temperature to form a crosslinked golf ball core having an outer surface having a first hardness and a geometric center having a second hardness greater than the first to define a negative hardness gradient; and forming a cover layer about the core to form the golf ball.

18 Claims, No Drawings

METHOD OF TREATING RUBBER COMPOSITION WITH CURE INHIBITOR TO CREATE SOFT SKIN IN GOLF BALL CORE

CROSS-REFERENCE TO RELATED APPLICATIONS

This application is a continuation-in-part of U.S. patent application Ser. No. 11/772,903, filed Jul. 3, 2007 now U.S. Pat. No. 7,537,529.

FIELD OF THE INVENTION

This invention relates generally to golf balls with cores, more particularly single layer cores, having a surface hardness equal to or less than the center hardness.

BACKGROUND OF THE INVENTION

Solid golf balls are typically made with a solid core encased by a cover, both of which can have multiple layers, such as a dual core having a solid center and an outer core layer, or a multi-layer cover having an inner. Generally, golf ball cores and/or centers are constructed with a thermoset rubber, typically a polybutadiene-based composition. The cores are usually heated and crosslinked to create certain characteristics, such as higher or lower compression, which can impact the spin rate of the ball and/or provide better "feel." These and other characteristics can be tailored to the needs of golfers of different abilities. From the perspective of a golf ball manufacturer, it is desirable to have cores exhibiting a wide range of properties, such as resilience, durability, spin, and "feel," because this enables the manufacturer to make and sell many different types of golf balls suited to differing levels of ability.

Heretofore, most single core golf ball cores have had a conventional hard-to-soft hardness gradient from the surface of the core to the center of the core. The patent literature contains a number of references that discuss a hard surface to soft center hardness gradient across a golf ball core.

U.S. Pat. No. 4,650,193 to Molitor et al. generally discloses a hardness gradient in the surface layers of a core by surface treating a slug of curable elastomer with a cure-altering agent and subsequently molding the slug into a core. This treatment allegedly creates a core with two zones of different compositions, the first part being the hard, resilient, central portion of the core, which was left untreated, and the second being the soft, deformable, outer layer of the core, which was treated by the cure-altering agent. The two "layers" or regions of the core are integral with one another and, as a result, achieve the effect of a gradient of soft surface to hard center.

U.S. Pat. No. 3,784,209 to Berman, et al. generally discloses a soft-to-hard hardness gradient. The '209 patent discloses a non-homogenous, molded golf ball with a core of "mixed" elastomers. A center sphere of uncured elastomeric material is surrounded by a compatible but different uncured elastomer. When both layers of elastomer are concurrently exposed to a curing agent, they become integral with one another, thereby forming a mixed core. The center of this core, having a higher concentration of the first elastomeric material, is harder than the outer layer. One drawback to this method of manufacture is the time-consuming process of creating first elastomer and then a second elastomer and then molding the two together.

Other patents discuss cores that receive a surface treatment to provide a soft 'skin'. However, since the interior portions of these cores are untreated, they have the similar hard surface to soft center gradient as conventional cores. For example, U.S. Pat. No. 6,113,831 to Nesbitt et al. generally discloses a conventional core and a separate soft skin wrapped around the core. This soft skin is created by exposing the preform slug to steam during the molding process so that a maximum mold temperature exceeds a steam set point, and by controlling exothermic molding temperatures during molding. The skin comprises the radially-outermost 1/32 inch to 1/4 inch of the spherical core. U.S. Pat. Nos. 5,976,443 and 5,733,206, both to Nesbitt et al., disclose the addition of water mist to the outside surface of the slug before molding in order to create a soft skin. The water allegedly softens the compression of the core by retarding crosslinking on the core surface, thereby creating an even softer soft skin around the hard central portion.

Additionally, a number of patents disclose multilayer golf ball cores, where each core layer has a different hardness thereby creating a hardness gradient from core layer to core layer.

There remains a need, however, to achieve a single layer core that has a soft-to-hard gradient (a "negative" gradient), from the surface to the center, and to achieve a method of producing such a core that is inexpensive and efficient. A core exhibiting such characteristics would allow the golf ball designer to create products with unique combinations of compression, "feel," and spin.

SUMMARY OF THE INVENTION

The present invention is directed to a method of making a golf ball comprising the steps of providing a preform comprising an uncured polybutadiene composition; coating the preform with a first cure-altering material; curing the coated preform at a predetermined temperature to form a crosslinked golf ball core having an outer surface having a first hardness and a geometric center having a second hardness greater than the first to define a negative hardness gradient; and forming a cover layer about the core to form the golf ball.

The step of coating the preform typically includes rolling, spraying, dipping, or dusting. The cure-altering material includes antioxidants, sulfur-bearing compounds, zinc methacrylate, zinc dimethacrylate, softening acrylate monomers or oligomers, soft powdered thermoplastic resins, phenol-comprising antioxidants, or hydroquinones, but is preferably at least one antioxidant. A second cure-altering material different from the first may also be used, such as a first cure-altering material that is an antioxidant and a second cure-altering material that is an antioxidant (different from the first) or a peroxide.

The uncured polybutadiene composition may be extruded to form an extrudate, which is cut to form a generally cylindrical preform. The uncured polybutadiene rubber preform may also be cold-formed into a spherical shape prior to coating. The preform may also be heated at a predetermined temperature and compressed predetermined pressure prior to curing. A step of centerless-grinding may also be used to ensure that the cured core is uniformly spherical. A surface-treatment with plasma discharge, corona discharge, silanes, or chlorination, may also be used to aid in adhesion with other layers.

The coated preform may be heated to a predetermined temperature for a predetermined time prior to curing the preform—the temperature being substantially below the predetermined cure temperature.

In a preferred "negative" gradient embodiment, the core outer surface hardness is 0 Shore C to 10 Shore C lower than the core geometric center hardness, more preferably 0 Shore C to about 5 Shore C lower.

The present invention is also directed to a method of making a golf ball comprising the steps of extruding a polybutadiene composition the form a cylindrical extrudate; cutting the extrudate to form an uncured polybutadiene preform; uniformly coating the preform with a cure-altering material comprising a first antioxidant; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball.

DETAILED DESCRIPTION OF THE INVENTION

The balls of the present invention may include a single-layer (one-piece) golf ball, and multi-layer golf balls, such as one having a core and a cover surrounding the core, but are preferably formed from a core comprised of a solid center (otherwise known as an inner core) and an outer core layer, an inner cover layer and an outer cover layer. Of course, any of the core and/or the cover layers may include more than one layer. In a preferred embodiment, the core is formed of an inner core and an outer core layer where both the inner core and the outer core layer have a "soft-to-hard" hardness gradient (a "negative" hardness gradient) radially inward from each component's outer surface towards its innermost portion (i.e., the center of the inner core or the inner surface of the outer core layer), although alternative embodiments involving varying direction and combination of hardness gradient amongst core components are also envisioned (e.g., a "negative" gradient in the center coupled with a "positive" gradient in the outer core layer, or vice versa).

The center of the core may also be a liquid-filled or hollow sphere surrounded by one or more intermediate and/or cover layers, or it may include a solid or liquid center around which tensioned elastomeric material is wound. Any layers disposed around these alternative centers may exhibit the inventive core hardness gradient (i.e., "negative"). The cover layer may be a single layer or, for example, formed of a plurality of layers, such as an inner cover layer and an outer cover layer.

As briefly discussed above, the inventive cores may have a hardness gradient defined by hardness measurements made at the surface of the inner core (or outer core layer) and radially inward towards the center of the inner core, typically at 2-mm increments. As used herein, the terms "negative" and "positive" refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number–a larger number=a negative number). It is preferred that the inventive cores have a zero or a negative hardness gradient, more preferably between zero (0) and −10, most preferably between 0 and −5.

The invention is more particularly directed to the creation of a soft "skin" on the outermost surface of the core, such as the outer surface of a single core or the outer surface of the outer core layer in a dual core construction. The "skin" is typically defined as the volume of the core that is within about 0.001 inches to about 0.100 inches of the surface, and more preferably about 0.010 inches to about 0.030 inches. In the most preferred embodiment, a single or multi-layer core is treated as a perform (prior to molding) by coating the surface of the perform with a cure-altering material. The cure-altering material may be in a solid form, typically a powder, prill, or small pellet, but alternatively may be in solution form, such as a liquid, dispersion, or slurry in a solvent. Suitable solvents include, but are not limited to, water, hydrocarbon solvents, polar solvents, and plasticizers. If a liquid is used, it is preferably water. In the most preferred embodiment, a free-flowing, relatively small particle-size powder is used to uniformly coat the perform.

Preferably the layer is a core or core layer, but also in an alternative embodiment a cover or cover layer (inner or outer cover layer) comprising a diene rubber composition, preferably polybutadiene rubber.

Cure-altering materials for treatment include, but are not limited to, antioxidants, sulfur-bearing compounds such as pentachlorothiophenol or metal salts thereof, ZDMA, softening acrylate monomers or oligomers, and soft powdered thermoplastic resins such as ethyl vinyl acetate, ethylene butyl acrylate, ethylene methyl acrylate, and very-low-modulus ionomers. Preferred cure-altering materials are phenol-comprising antioxidants, hydroquinones, and "soft and fast" agents, such as organosulfur compounds, inorganic sulfur compounds, and thiophenols, particularly pentachlorothiophenol (PCTP) and metal salts of PCTP, such as ZnPCTP, MgPCTP, DTDS, and those disclosed in U.S. Pat. Nos. 6,458,895; 6,417,278; and 6,635,716; and U.S. Patent Application Publication Serial No. 2006/021586, the disclosure of which are incorporated herein by reference. Alternatively, thermoplastic or thermosetting powders, such as low molecular weight polyethylene, ethyl vinyl acetate, ethylene copolymers and terpolymers (i.e., NUCREL®), ethylene butyl acrylate, ethylene methyl acrylate, polyurethanes, polyureas, polyurethane-copolymers (i.e., silicone-urethanes), PEBAX®, HYTREL®, polyesters, polyamides, epoxies, silicones, and Micromorph® materials, such as those disclosed in U.S. Patent Application Publication Ser. Nos. 11/690,530 and 11/690,391, incorporated herein by reference.

In one particularly preferred embodiment, a polybutadiene rubber preform is coated with an antioxidant-comprising powder and then molded at 350-360° F. for 11 minutes to form a single core. The resultant core has an outer diameter of about 1.580 inches and a geometric center point hardness of about 60 Shore C to about 80 Shore C, preferably about 65 Shore C to about 78 Shore C, and most preferably about 70 Shore C to about 75 Shore C. The hardness at a distance of about 8 mm from the center point is about 75 Shore C to about 77 Shore C; at 14 mm from the center point about 73 Shore C to about 75 Shore C, at 18 mm from the center point about 80 Shore C; at 25 mm from the center point about 85 Shore C; and at 30 mm from the center point about 90 Shore C. At a point about 31 mm to about 40 mm from the center point of the core, the soft "skin" has a hardness of about 60 Shore C to about 80 Shore C, preferably 65 Shore C to about 75 Shore C, and most preferably about 68 Shore C to about 74 Shore C, resulting in an overall gradient (as measured from center to surface) of zero, and most preferably negative (i.e., about −30 to 0, more preferably about −15 to 0, most preferably about −10 to 0). The core of this example typically has an Atti compression of about 70 and a COR of about 0.800, when measured at an incoming velocity of 125 ft/s. Preferred Atti core compressions are 110 of less, preferably 100 or less, more preferably 90 or less, and most preferably 80 or less.

A second particularly preferred embodiment is a two-piece core formed from an inner core and an outer core layer. The inner core may or may not be "treated" as described herein, but preferably the outer core layer is treated to create the soft outer "skin." In one embodiment, a soft inner core is surrounded by a relatively hard outer core layer. The inner core preferably has a an outer diameter of about 1.0 inch, a center point hardness of about 55 Shore C to about 60 Shore C, and an outer surface hardness of about 75 Shore C to about 80 Shore C. The surface hardness of the modified "skin" of the outer core layer is about 60 Shore C to about 80 Shore C, more preferably about 65 Shore C to about 75 Shore C, and most preferably about 68 Shore C to about 74 Shore C. A preferred overall gradient is negative to zero, most preferably negative (i.e., about −30 to 0, more preferably about −15 to 0, most preferably about −10 to 0).

The core formulations used in the invention are preferably based upon high-cis polybutadiene rubber that is cobalt-, nickel-, lithium-, or neodymium-catalyzed, most preferably Co— or Nd-catalyzed, having a Mooney viscosity of about 25 to about 125, more preferably about 30 to about 100, and most preferably about 40 to about 60. Lesser amounts of non-polybutadiene rubber, such as styrene butadiene rubber, trans-polyisoprene, natural rubber, butyl rubber, ethylene propylene rubber, ethylene propylene diene monomer rubber, low-cis polybutadiene rubber, or trans polybutadiene rubber, may also be blended with the polybutadiene rubber. A coagent, such as zinc diacrylate or zinc dimethacrylate, is typically present at a level of about 0 pph to about 60 pph, more preferably about 10 pph to about 55 pph, and most preferably about 15 pph to about 40 pph. A peroxide or peroxide blend is also typically present at about 0.1 pph to about 5.0 pph, more preferably about 0.5 pph to about 3.0 pph. Zinc oxide may also be present at about 5 pph to about 50 pph and the antioxidant is preferably present at about 0 pph to about 0.1 pph to about 5.0 pph, preferably about 0.5 pph to about 3.0 pph.

Other embodiments include any number of core layers and gradient combinations wherein at least one layer of the core has a surface that is "treated" as described herein.

Scrap automotive tire regrind (in fine powder form) is also sufficient for creating the inventive soft outer "skin," as well as other powdered rubbers that are uncrosslinked or partially crosslinked and therefore able to react with the polybutadiene. Fully crosslinked powdered rubber may also still have enough affinity for the polybutadiene substrate to adhere (even react minimally) enough to form a good bond.

Other potential surface-softening or cure-altering agents include, but are not limited to, sulfated fats, sodium salts of alkylated aromatic sulfonic acids, substituted benzoid alkyl sulfonic acids, monoaryl and alkyl ethers of diethylene glycol and dipropylene glycol, ammonium salts of alkyl phosphates, sodium alkyl sulfates and monosodium salt of sulfated methyl oleate and sodium salts of carboxylated eletrolytes. Other suitable materials include dithiocarbamates, such as zinc dimethyl dithiocarbamate, zinc diethyl dithiocarbamate, zinc di-n-butyl dithiocarbamate, zinc diamyl dithiocarbamate, tellurium diethyl dithiocarbamate, selenium dimethyl dithiocarbamate, selenium diethyl dithiocarbamate, lead diamyl dithiocarbamate, bismuth dimethyl dithiocarbamate, cadmium diethyl dithiocarbamate, and mixtures thereof.

The method for making the golf ball of the invention includes a variety of steps and options. Typically, a Banbury-type mixer or the like is used to mix the polybutadiene rubber composition. The rubber composition is extruded as an extrudate and cut to a predetermined shape, such as a cylinder, typically called a "preform". The preform comprising the uncured polybutadiene composition is then prepared for coating with at least one of the cure-altering (inhibiting) materials, liquids, or solvents described above. Preferred cure-altering materials include wherein the cure-altering material comprises antioxidants, sulfur-bearing compounds, zinc methacrylate, zinc dimethacrylate, softening acrylate monomers or oligomers, soft powdered thermoplastic resins, phenol-comprising antioxidants, or hydroquinones, most preferably an antioxidant.

In one embodiment, more than one cure-altering material is used, in succession. In this embodiment, a preferred combination includes a first cure-altering material such as an antioxidant and a second cure-altering material such as a different antioxidant or a peroxide. A compatiblilizer and/or tie layer may be incorporated. Additionally, a two-stage dip or roll (in the cure-altering material) may be used to sequentially provide a first and second antioxidant or an antioxidant and a peroxide.

Optionally, prior to coating the preform, the uncured preform may be shaped or cold-formed into a rough sphere. The coating may be performed in a variety of manners including, but not limited to, rolling, spraying, dipping, or dusting. The coating may be uniform or varied, but is preferably uniform.

The uncured, coated preform may optionally be heated to a predetermined temperature for a predetermined time, the temperature being substantially below the predetermined cure temperature, so that the cure-altering material may diffuse, penetrate, migrate, or otherwise work its way into the preform or, alternatively, any solvent may evaporate or the preform may dry (if the coating was in liquid form). If two cure-altering materials are employed, this time is also preferred to allow any reaction that may occur to come to completion.

The uncured coated preform is then cured or molded at a predetermined temperature and time to form a crosslinked golf ball core. As described in detail above, the core has an outer surface having a first hardness and a geometric center having a second hardness greater than the first to define a "negative" hardness gradient. Any one of a number of cover layers may be formed around the "negative" gradient core including, but not limited to, an outer core layer, an inner cover layer, and an outer cover layer.

The cured core is then typically centerless-grinded so that the core is uniformly spherical and has a surface than is roughened and textured to be better suited for adhesion with subsequent layers. Prior to of after the centerless grinding the core may be treated with plasma discharge, corona discharge, silanes, or chlorination, for example, to aid in its adhesion properties.

A particularly preferred method includes the steps of extruding a polybutadiene composition the form a cylindrical extrudate; cutting the extrudate to form an uncured polybutadiene preform; uniformly coating the preform with a cure-altering material comprising a first antioxidant; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball.

Preferably, the core layers (inner core or outer core layer) is made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%.

Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; KINEX® 7245 and KINEX® 7265, commercially available from Goodyear of Akron, Ohio; SE BR-1220, and TAKTENE® 1203G1, 220, and 221, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; PETROFLEX® BRNd-40; and KARBOCHEM® ND40, ND45, and ND60, commercially available from Karbochem.

The base rubber may also comprise high or medium Mooney viscosity rubber, or blends thereof. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention.

In one embodiment of the present invention, golf ball cores made with mid-to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid-to high-Mooney viscosity polybutadiene include Bayer AG CB23 (Nd-catalyzed), which has a Mooney viscosity of around 50 and is a highly linear polybutadiene, and Shell 1220 (Co-catalyzed). If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises a Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) many also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy)hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy)diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 40KE) available from Crompton (Geo Specialty Chemicals). Similar initiating agents are available from AkroChem, Lanxess, Flexsys/Harwick and R.T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Sartomer Co. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290.

Suitable antioxidants include, but are not limited to, alkylene-bis-alkyl substituted cresols, such as 4,4'-methylene-bis (2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4 (decylidene)-bis-(5-ethyl-p-cresol); (2,5-dimethyl-4-hydroxyphenyl) (2-hydroxy-3,5-dimethylphenyl)methane; (2-methyl-4-hydroxy-5-ethylphenyl) (2-ethyl-3-hydroxy-5-methylphenyl)methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl)nonyl-methane; (3-methyl-2-hydroxy-6-ethylphenyl)-(2-isopropyl-3-hydroxy-5-methyl-phenyl)cyclohexylmethane; (2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol; 3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol; 2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n-hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis(4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis (2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3, 3',5,5'-tetramethylstilbene; 2,2'-isopropylidene bis(4-methyl-6-t-butyl phenol); ethylene bis(beta-naphthol); 1,5-dihydroxy naphthalene; 2,2'-ethylene bis(4-methyl-6-propyl phenol); 4,4'-methylene bis(2-propyl-6-t-butyl phenol); 4,4'-ethylene bis(2-methyl-6-propyl phenol); 2,2'-methylene bis(5-methyl-6-t-butyl phenol); and 4,4'-butylidene bis(6-t-butyl-3-methyl phenol);

Suitable antioxidants further include, but are not limited to, alkylene trisphenols, such as 2,6-bis(2'-hydroxy-3'-t-butyl-5'-methyl benzyl)-4-methyl phenol; 2,6-bis(2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr.

In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 335° F., more preferably about 300° F. to about 325° F., and the stock is held at that temperature for at least about 10 minutes to about 30 minutes.

The thermoset rubber composition of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

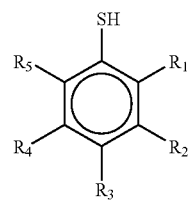

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)

disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl) disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Other suitable soft and fast agents include, but are not limited to, hydroquinones, benzoquinones, quinhydrones, catechols, and resorcinols.

Suitable hydroquinone compounds include compounds represented by the following formula, and hydrates thereof:

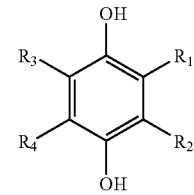

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable hydroquinone compounds include, but are not limited to, hydroquionone; tetrachlorohydroquinone; 2-chlorohydroquinone; 2-bromohydroquinone; 2,5-dichlorohydroquinone; 2,5-dibromohydroquinone; tetrabromohydroquinone; 2-methylhydroquinone; 2-t-butylhydroquinone; 2,5-di-t-amylhydroquinone; and 2-(2-chlorophenyl)hydroquinone hydrate.

More suitable hydroquinone compounds include compounds represented by the following formula, and hydrates thereof:

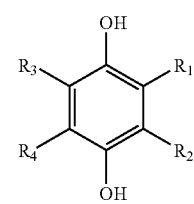

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable benzoquinone compounds include compounds represented by the following formula, and hydrates thereof:

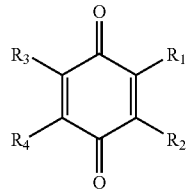

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable benzoquinone compounds include one or more compounds represented by the following formula, and hydrates thereof:

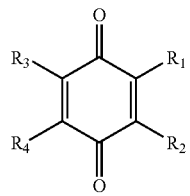

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable quinhydrones include one or more compounds represented by the following formula, and hydrates thereof:

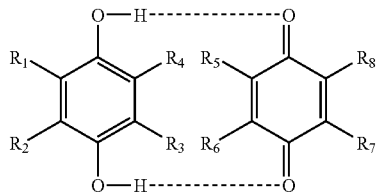

wherein each $R_1$, $R_2$, $R_3$, $R_4$, $R_5$, $R_6$, $R_7$, and $R_8$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable quinhydrones include those having the above formula, wherein each $R_1$, $R_2$, $R_3$, $R_4$, $R_5$, $R_6$, $R_7$, and $R_8$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable catechols include one or more compounds represented by the following formula, and hydrates thereof:

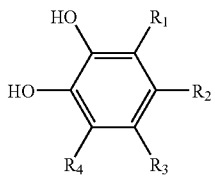

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Suitable resorcinols include one or more compounds represented by the following formula, and hydrates thereof:

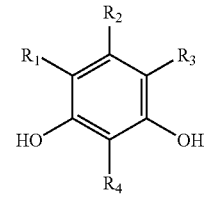

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 μm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetra methylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

A number of cores were formed based on the formulation and cure cycle described in TABLE 1 below and core hardness values are reported in TABLE 2 below.

TABLE 1

| Formulation (phr) | Ex 1 | Ex 2 | Ex 3 | Comp Ex 1 | Comp Ex 2 | Comp Ex 3 |
|---|---|---|---|---|---|---|
| SR-526+ | 34.0 | 34.0 | 31.2 | 29.0 | 29.0 | 29.0 |
| ZnO | 5 | 5 | 5 | 5 | 5 | 5 |
| BaSO$_4$ | 11.2 | 11.2 | 16.1 | 13.8 | 13.8 | 13.8 |
| Vanox MBPC* | 0.40 | 0.40 | 0.40 | — | 0.50 | — |
| Trigonox-265-50B** | 1.4 | 1.4 | 1.6 | — | — | 0.8 |
| Perkadox BC-FF*** | — | — | — | 1.0 | 1.6 | — |
| polybutadiene | 100 | 100 | 100 | 100 | 100 | 100 |
| ZnPCTP | 2.35 | 2.35 | 2.60 | 2.35 | 2.35 | 2.35 |
| regrind | — | — | 17 | 17 | — | — |
| antioxidant/initiator ratio | 0.57 | 0.57 | 0.50 | — | 0.31 | — |
| Cure Temp. (° F.) | 305 | 315 | 320 | 350 | 335 | 335 |
| Cure Time (min) | 14 | 11 | 16 | 11 | 11 | 11 |
| Properties | | | | | | |
| diameter (in) | 1.530 | 1.530 | 1.530 | 1.530 | 1.530 | 1.530 |
| compression | 69 | 63 | 70 | 69 | 47 | — |
| COR @ 125 ft/s | 0.808 | 0.806 | 0.804 | 0.804 | — | — |

*Vanox MBPC: 2,2'-methylene-bis-(4-methyl-6-t-butylphenol) available from R.T. Vanderbilt Company Inc.;
**Trigonox 265-50B: a mixture of 1,1-di(t-butylperoxy)-3,3,5-trimethycyclohexane and di(2-t-butylperoxyisopropyl)benzene 50% active on an inert carrier available from Akzo Nobel;
***Perkadox BC-FF: Dicumyl peroxide (99%-100% active) available from Akzo Nobel; and
+SR-526: ZDA available from Sartomer

TABLE 2

| | Shore C Hardness | | | | | |
|---|---|---|---|---|---|---|
| Distance from Center | Ex 1 | Ex 2 | Ex 3 | Comp Ex 1 | Comp Ex 2 | Comp Ex 3 |
| Center | 73 | 70 | 71 | 61 | 52 | 61 |
| 2 | 74 | 71 | 72 | 67 | 57 | 62 |
| 4 | 74 | 72 | 73 | 70 | 62 | 65 |
| 6 | 75 | 73 | 73 | 72 | 64 | 67 |
| 8 | 75 | 73 | 73 | 73 | 64 | 69 |
| 10 | 75 | 73 | 74 | 73 | 64 | 71 |
| 12 | 74 | 74 | 73 | 72 | 66 | 72 |
| 14 | 74 | 74 | 72 | 73 | 70 | 73 |
| 16 | 70 | 71 | 70 | 77 | 71 | 73 |
| 18 | 60 | 60 | 63 | 80 | 72 | 73 |
| Surface | 63 | 70 | 66 | 85 | 73 | 74 |
| Surface − Center | −10 | 0 | −5 | 24 | 21 | 13 |

The surface hardness of a core is obtained from the average of a number of measurements taken from opposing hemispheres of a core, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface of a core, care must be taken to insure that the core is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand, such that the weight on the durometer and attack rate conform to ASTM D-2240.

To prepare a core for hardness gradient measurements, the core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut, made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' core surface is ground to a smooth, flat surface, revealing the geometric center of the core, which can be verified by measuring the height of the bottom of the holder to the exposed surface of the core, making sure that exactly half of the original height of the core, as measured above, has been removed to within ±0.004 inches.

Leaving the core in the holder, the center of the core is found with a center square and carefully marked and the hardness is measured at the center mark. Hardness measurements at any distance from the center of the core may be measured by drawing a line radially outward from the center mark, and measuring and marking the distance from the center, typically in 2-mm increments. All hardness measurements performed on the plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for single, solid core, such that a core surface softer than its center will have a negative hardness gradient.

Referring to TABLES 1-2, in Example 1, the surface is 10 Shore C points lower than the center hardness and 12 Shore C points lower than the hardest point in the core. In Example 3, the surface is 5 Shore C points lower than the center hardness and 8 Shore C points lower than the hardest point in the core. In Example 2, the center and surface hardness values are equal and the softest point in the core is 10 Shore C points lower than the surface.

In the examples of the invention presented in TABLE 1, the cure temperatures are varied from 305° F. to 320° F. and cure times are varied from 11 to 16 minutes. The core compositions of examples 1 and 2 are identical, and only the cure cycle is changed. In example 3 the amount of antioxidant is identical to examples 1 and 2, but other ingredients are varied as well the cure cycle. Additionally, the ratio of antioxidant to initiator varies from 0.50 to 0.57 from example 1 and 2 to example 3.

The ratio of antioxidant to initiator is one factor to control the surface hardness of the cores. The data shown in TABLE 2 shows that hardness gradient is at least, but not limited to, a function of the amount of antioxidant and peroxide, their ratio, and the cure cycle. It should be noted that higher antioxidant also requires higher peroxide initiator to maintain the desired compression.

In FIG. 1, cores of Comparative Examples 1-3 are compared to the inventive cores. The core of Comparative Example 1, whose composition is shown in TABLE 1 was cured using a conventional cure cycle, with a cure temperature of 350° F. and a cure time of 11 minutes. The inventive cores were produced using cure cycles of 305° F. for 14 minutes, 315° F. for 11 minutes and 320° F. for 16 minutes. The hardness gradients of these cores were measured and the following observations can be made. For the cores of the Comparative Examples, as expected, a conventional hard surface to soft center gradient can be clearly seen. The gradients for inventive cores follow substantially the same shape as one another.

In all preferred embodiments of invention, the hardness of the core at the surface is at most about the same as or substantially less than the hardness of the core at the center. Furthermore, the center hardness of the core may not be the hardest point in the core, but in all cases, it is preferred that it is at least equal to or harder than the surface. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still equal to, or less than the hardness of the center. It should be noted that in the present invention the formulation is the same throughout the core, or core layer, and no surface treatment is applied to the core to obtain the preferred surface hardness.

While the inventive golf ball may be formed from a variety of differing and conventional cover materials (both intermediate layer(s) and outer cover layer), preferred cover materials include, but are not limited to:

(1) Polyurethanes, such as those prepared from polyols or polyamines and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Patent Application Publication No. 2005/0176523, which is incorporated by reference in its entirety.

Any polyisocyanate available to one of ordinary skill in the art is suitable for use according to the invention. Exemplary polyisocyanates include, but are not limited to, 4,4'-diphenylmethane diisocyanate (MDI); polymeric MDI; carbodiimide-modified liquid MDI; 4,4'-dicyclohexylmethane diisocyanate ($H_{12}$MDI); p-phenylene diisocyanate (PPDI); m-phenylene diisocyanate (MPDI); toluene diisocyanate (TDI); 3,3'-dimethyl-4,4'-biphenylene diisocyanate; isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer isocyanate groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 8.0% NCO, more preferably no greater than about 7.8%, and most preferably no greater than about 7.5% NCO with a level of NCO of about 7.2 or 7.0, or 6.5% NCO commonly used.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes are used to form one or more of the cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylenediisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate. The most preferred saturated diisocyanates are 4,4'-dicyclohexylmethane diisocyanate and isophorone diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino) cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Additionally, polyurethane can be replaced with or blended with a polyurea material. Polyureas are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene)ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate; 3,3'-dimethyl-4,4'-biphenylene diisocyanate; toluene diisocyanate; polymeric MDI; carbodiimide-modified liquid 4,4'-diphenylmethane diisocyanate; para-phenylene diisocyanate; meta-phenylene diisocyanate; triphenyl methane-4,4'-and triphenyl methane-4,4'-triisocyanate; naphthylene-1,5-diisocyanate; 2,4'-, 4,4'-, and 2,2-biphenyl diisocyanate; polyphenyl polymethylene polyisocyanate; mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4-and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4-and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane); 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Cover layers of the inventive golf ball may also be formed from ionomeric polymers, preferably highly-neutralized ionomers (HNP). In a preferred embodiment, at least one intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either filly or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth) acrylic acid/ethyl acrylate, and ethylene/(meth) acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono-or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

In a preferred embodiment, the inventive single-layer core is enclosed with two cover layers, where the inner cover layer has a thickness of about 0.01 inches to about 0.06 inches, more preferably about 0.015 inches to about 0.040 inches, and most preferably about 0.02 inches to about 0.035 inches, and the inner cover layer is formed from a partially-or fully-neutralized ionomer having a Shore D hardness of greater than about 55, more preferably greater than about 60, and most preferably greater than about 65. In this embodiment, the outer cover layer should have a thickness of about 0.015 inches to about 0.055 inches, more preferably about 0.02 inches to about 0.04 inches, and most preferably about 0.025 inches to about 0.035 inches, and has a hardness of about Shore D 60 or less, more preferably 55 or less, and most preferably about 52 or less. The inner cover layer should be harder than the outer cover layer. In this embodiment the outer cover layer comprises a partially-or fully-neutralized ionomer, a polyurethane, polyurea, or blend thereof. A most preferred outer cover layer is a castable or reaction injection molded polyurethane, polyurea or copolymer or hybrid thereof having a Shore D hardness of about 40 to about 50. A most preferred inner cover layer material is a partially-neutralized ionomer comprising a zinc, sodium or lithium neutralized ionomer such as SURLYN® 8940, 8945, 9910, 7930, 7940, or blend thereof having a Shore D hardness of about 63 to about 68.

In another multi-layer cover, single core embodiment, the outer cover and inner cover layer materials and thickness are the same but, the hardness range is reversed, that is, the outer cover layer is harder than the inner cover layer.

In an alternative preferred embodiment, the golf ball is a one-piece golf ball having a dimpled surface and having a surface hardness equal to or less than the center hardness (i.e., a negative hardness gradient). The one-piece ball preferably has a diameter of about 1.680 inches to about 1.690 inches, a weight of about 1.620 oz, an Atti compression of from about 40 to 120, and a COR of about 0.750-0.825.

In a preferred two-piece ball embodiment, the single-layer core having a negative hardness gradient is enclosed with a single layer of cover material having a Shore D hardness of from about 20 to about 80, more preferably about 40 to about 75 and most preferably about 45 to about 70, and comprises a thermoplastic or thermosetting polyurethane, polyurea, polyamide, polyester, polyester elastomer, polyether-amide or polyester-amide, partially or fully neutralized ionomer, polyolefin such as polyethylene, polypropylene, polyethylene copolymers such as ethylene-butyl acrylate or ethylene-methyl acrylate, poly(ethylene methacrylic acid) co-and terpolymers, metallocene-catalyzed polyolefins and polar-group functionalized polyolefins and blends thereof. A preferred cover material in the two-piece embodiment is an ionomer (either conventional or HNP) having a hardness of about 50 to about 70 Shore D. Another preferred cover material in the two-piece embodiment is a thermoplastic or thermosetting polyurethane or polyurea. A preferred ionomer is a high acid ionomer comprising a copolymer of ethylene and methacrylic or acrylic acid and having an acid content of at least 16 to about 25 weight percent. In this case the reduced spin contributed by the relatively rigid high acid ionomer may be offset to some extent by the spin-increasing negative gradient core. The core may have a diameter of about 1.0 inch to about 1.64 inches, preferably about 1.30 inches to about 1.620, and more preferably about 1.40 inches to about 1.60 inches.

Another preferred cover material comprises a castable or reaction injection moldable polyurethane, polyurea, or copolymer or hybrid of polyurethane/polyurea. Preferably, this cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

In any of these embodiments the single-layer core may be replaced with a 2 or more layer core wherein at least one core layer has a negative hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of making a golf ball comprising the steps of:
   providing a preform comprising an uncured polybutadiene composition;
   coating the uncured preform with a first cure-altering material;
   curing the coated uncured perform at a predetermined temperature to form a single unitary crosslinked golf ball core having an outer surface having a first hardness and a geometric center having a second hardness greater than the first to define a negative hardness gradient; and
   forming a cover layer about the core to form the golf ball.

2. The method of claim 1, wherein the step of coating the preform comprises rolling, spraying, dipping, or dusting.

3. The method of claim 1, wherein the cure-altering material comprises antioxidants, zinc methacrylate, zinc dimethacrylate, softening acrylate monomers or oligomers, soft powdered thermoplastic resins, phenol-comprising antioxidants, or hydroquinones.

4. The method of claim 1, wherein the cure-altering material comprises an antioxidant.

5. The method of claim 3, wherein the soft powdered thermoplastic resins comprise ethyl vinyl acetate, ethylene butyl acrylate, ethylene methyl acrylate, or very-low-modulus ionomer.

6. The method of claim 1, wherein the step of coating further comprises coating the preform with a second cure-altering material different from the first.

7. The method of claim 6, wherein the first cure-altering material is an antioxidant and the second cure-altering material comprises an antioxidant or a peroxide.

8. The method of claim 1, wherein the step of providing the preform further comprises extruding the uncured polybutadiene composition to form an extrudate and cutting the extrudate to form the preform.

9. The method of claim 1, wherein the step of providing the preform further comprises cold-forming the uncured polybutadiene rubber preform into a spherical shape.

10. The method of claim 1, wherein the step of curing the coated preform further comprises heating the preform at a predetermined temperature and compressing the preform at a predetermined pressure.

11. The method of claim 1, further comprising the step of centerless-grinding the core such that the core is uniformly spherical.

12. The method of claim 1, further comprising the step of surface-treating the core with plasma discharge, corona discharge, silanes, or chlorination.

13. The method of claim 1, wherein the first hardness is 0 Shore C to 10 Shore C lower than the second hardness.

14. The method of claim 13, wherein the first hardness is 0 Shore C to about 5 Shore C lower than the second hardness.

15. The method of claim 1, further comprising the step of forming an outer core layer about the uniformly-spherical core to form a dual core.

16. The method of claim 1, further comprising the step of forming an intermediate layer about the core prior to forming the cover layer.

17. A method of making a golf ball comprising the steps of:
   extruding a polybutadiene composition the form a cylindrical extrudate;
   cutting the extrudate to form an uncured polybutadiene preform;
   uniformly coating the uncured preform with a cure-altering material comprising a first antioxidant;
   curing the coated preform to form a single, unitary crosslinked core having an outer surface having a first hardness and a geometric center having a second hardness greater than the first to define a negative hardness gradient;
   centerless-grinding the cured core to form a uniformly-spherical core having increased surface roughness;
   forming an inner cover layer about the uniformly-spherical core; and
   forming an outer cover layer about the inner cover layer to form the golf ball.

18. The method of claim 17, further comprising the step of forming an outer core layer about the uniformly-spherical core to form a dual core.

* * * * *